April 9, 1929.  J. C. ROBERTS  1,708,329
TRANSMISSION FOR MOTOR BOATS
Filed May 21, 1927
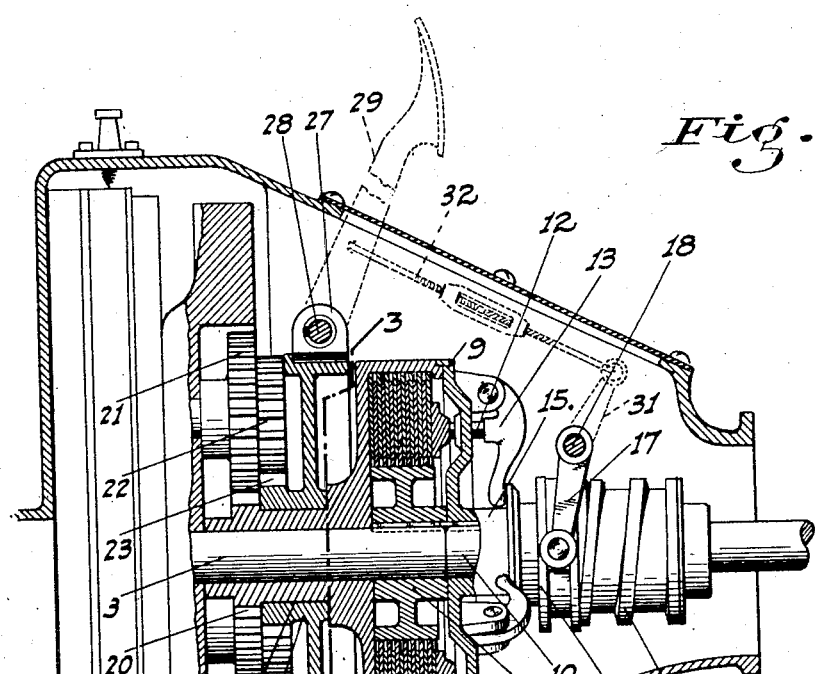
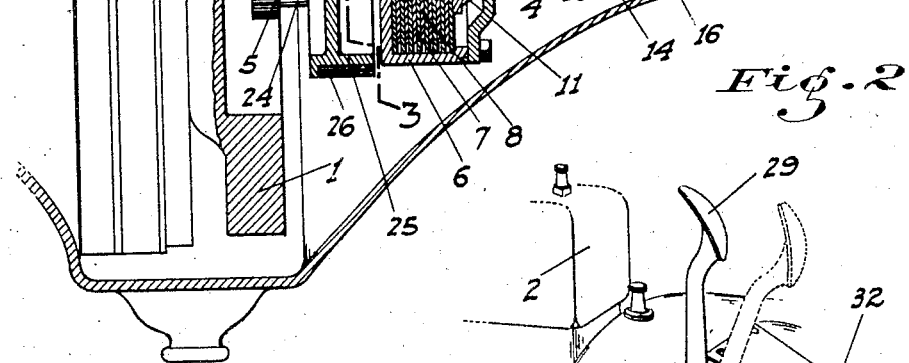
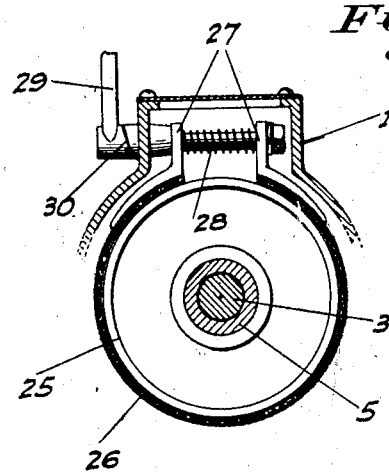
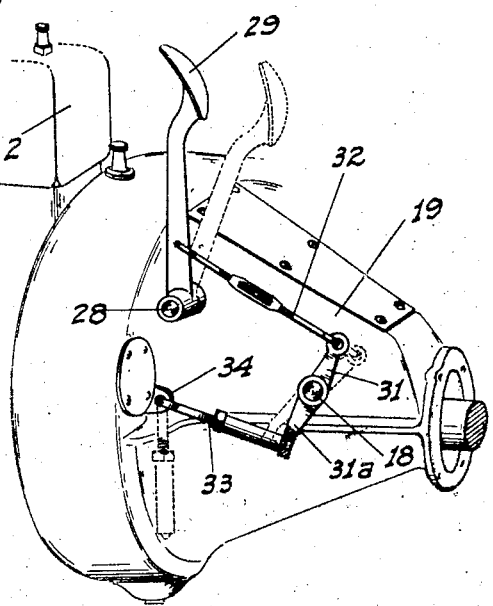
INVENTOR
J. C. Roberts
BY *Perry J. Webster*
ATTORNEY Patented Apr. 9, 1929.

1,708,329

UNITED STATES PATENT OFFICE.

JACK C. ROBERTS, OF CERES, CALIFORNIA.

TRANSMISSION FOR MOTOR BOATS.

Application filed May 21, 1927. Serial No. 193,200.

This invention relates to improvements in transmission devices especially for use on motor boats driven by non-reversible internal combustion engines and in which the conditions of operation are such that only a single forward transmission speed, a reverse speed and a neutral position are required.

The principal object of my invention is to provide a transmission structure for the purpose so constructed that the propeller shaft may be turned in reverse at engine speed or at the same speed ratio as the forward speed; and one which is inexpensive to construct and repair and which is very easily operated and controlled.

These objects I accomplish by means of such structure and relative arrangement of parts as will fully appear from a perusal of the following specification and claims:

Fig. 1 is a sectional elevation of my improved structure.

Fig. 2 is a perspective outline of the exterior of the structure.

Fig. 3 is a fragmentary cross section on the line 3—3 of Fig. 1.

Referring now more particularly to the characters of reference on the drawings, the numeral 1 denotes a fly-wheel member driven from the engine 2, to which member is secured a rearwardly projecting shaft 3. Keyed onto the rear end of this shaft is a clutch drum 4. Turnable on the shaft ahead of the drum is a sleeve 5 on the rear end of which, just ahead of the drum 4, is formed an outer clutch drum 6 which overhangs the drum 4 in concentric and spaced relation therewith.

Clutch plates 7 are secured in the drum 6 in the conventional manner, while intermediate and cooperating clutch plates 8 are mounted in a similar manner in the drum 4. A back plate 9 is secured onto the rear end of the drum 6 and is keyed to a shaft 10 which is longitudinally alined with but separate from the shaft 3.

The clutch plates are normally held in frictional engagement with each other by a ring 11 bearing against the rearmost plate. Pins 12 slidable through and mounted in the plate 9 bear against said ring and are secured on their outer ends to dogs 13 which are pivoted at one end on the outer face of said plate. The free ends of the dogs are engaged by a collar 14 slidably mounted on the hub 15 of the plate 9. The collar is forced along the hub toward the transmission structure so as to normally maintain the clutch plates engaged by a spring 16. This spring is overcome when it is desired to disengage the clutch by a shifting yoke 17 engaging the collar 14 and fixed on a transverse shaft 18 which is mounted in the casing 19 in which the transmission structure is enclosed. This shaft is oscillated to actuate the shifting yoke by a structure hereinafter described. By means of this construction, however, it will be seen that when the clutch is engaged the power from the flywheel and shaft 3 will be transmitted direct to the shaft 10 to turn the latter at the same speed as said shaft 3 and in the same direction.

Formed on and secured to the forward end of the sleeve 5 is a pinion 20 meshing with gears 21 rotatably mounted in the flywheel in offset relation to the axis thereof. Pinions 22 mounted in fixed connection with the gears 21 rearwardly of the same mesh with a gear 23 fixed on the forward end of the hub 24 of a drum 25, said hub being rotatable on the sleeve 5. A normally slack brake band 26 is disposed about said drum and has separated ears 27 on its adjacent ends through which a transverse shaft 28 passes and which is journaled in the casing 19 for rotatable and sliding movement transversely thereof. A pedal or other suitable lever 29 is fixed on and projects upwardly from the shaft 28 outside the casing. A cam device 30 between the lever and casing is arranged to cause the band ears, when said lever is moved forwardly a certain distance, to be brought toward each other so as to clamp the band about the drum 25 and prevent rotation thereof. The lever a certain distance above the shaft is connected to an arm 31 which projects upwardly from the outer end of the shaft 18 by an adjustable link 32.

These parts are so arranged that when the lever is in its rearmost position the band will be slack on the brake drum and the clutch will be engaged. When the lever is moved forwardly a certain distance the clutch will be disengaged without causing the band to be clamped on the drum. In this case therefore no motion will be imparted to the shaft 10 as will be evident. Any suitable means may be employed if necessary and desired to hold the lever set in this neutral position. In the present instance I have shown for the purpose a rigid longitudinally adjustable rod member 33, which is pivoted onto a bracket 34 fixed onto the casing 19 ahead of the shaft 18. This rod member is adapted at its rear end to detachably engage the lower extension 31ª of the arm 31 as shown in Fig. 2.

When the pedal lever is shifted forward beyond said neutral position the member 33 will automatically disengage itself from the arm 31ª and will drop to a vertical position out of the way. With an additional forward movement of the pedal the clutch still remains disengaged but the brake band will be clampingly applied to the drum 25.

Said drum will therefore be held stationary and with a continued rotation of the flywheel, the gear and pinion units 21 and 22 will be caused to turn. The turning of the gears 21 causes a rotation of the pinion 20 to be had in the opposite direction to the rotation of the flywheel and shaft 3. This reverse movement will be imparted to the drum 6 and thence to the back plate 9 and the shaft 10, so as to turn the latter in the reverse direction to that of the shaft 3. The drum 4 and the clutch plates thereon are still turning but since said plates are disengaged from the plates on the drums 6, no resistance or interference with the reverse movement of the latter is had. The various pairs of pinions and gears are so proportioned in size that the reverse speed imparted to the shaft 10 will be the same as that of the shaft 3 in the forward direction.

From the above description and the showing on the drawings it will be obvious to anyone acquainted with the construction of the standard transmission structure of a Ford engine that my improved device can be readily built up or assembled from such Ford structure with but comparatively few alterations being necessary and with but the addition of a single new part—the link 32 (and the member 33 if such is used). As a result my device can be easily formed by those needing an apparatus of this kind at a small expense and with only an elementary knowledge of the mechanical arts being necessary, such as the average person working with engines and motor boats possesses.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a transmission structure a clutch, a transverse shaft for operating the clutch, a housing in which said clutch and shaft are mounted and from which the shaft projects, a lever secured intermediate its ends onto the shaft, a pedal lever pivoted on the housing, a connection between the pedal above its pivot and the upper end of the lever, and a rigid member pivoted at its forward end onto the housing ahead of the lever and adapted to releasably engage the lower portion of the lever.

2. A structure as in claim 1, in which the lever is provided with an orifice extending at right angles to the axis of the lever and the rear end of the member is provided with a shouldered nub to enter said orifice.

In testimony whereof I affix my signature.

JACK C. ROBERTS.